United States Patent
Goto et al.

[11] Patent Number: 5,323,722
[45] Date of Patent: Jun. 28, 1994

[54] EMBROIDERING MACHINE

[75] Inventors: Hisaharu Goto, Nagoya; Seiichiro Hagino, Chiryu, both of Japan

[73] Assignee: Aisin Seiki Kabushiki Kaisha, Kariya, Japan

[21] Appl. No.: 943,229

[22] Filed: Sep. 10, 1992

[30] Foreign Application Priority Data

Sep. 12, 1991 [JP] Japan .................. 3-233369

[51] Int. Cl.⁵ .................. D05B 21/00; D05C 9/04
[52] U.S. Cl. .................. 112/121.2; 112/103
[58] Field of Search .................. 112/121.12, 121.11, 112/103, 457, 102, 78, 98, 262.3, 266.1; 364/470

[56] References Cited
U.S. PATENT DOCUMENTS

| | | | |
|---|---|---|---|
| 3,965,832 | 6/1976 | Egtvedt et al. | 112/262.3 |
| 4,526,116 | 7/1985 | Mannel | 112/103 X |
| 4,834,008 | 5/1989 | Sadeh et al. | 112/121.12 |
| 4,967,676 | 11/1990 | Hagino et al. | 112/272 |
| 4,998,489 | 3/1991 | Hisatake et al. | 112/103 |
| 5,021,965 | 6/1991 | Olbrich | 364/470 X |
| 5,131,339 | 7/1992 | Goodridge | 112/121.12 |

*Primary Examiner*—Peter Nerbun
*Attorney, Agent, or Firm*—Burns, Doane, Swecker & Mathis

[57] ABSTRACT

An embroidering machine comprises a body including a bed and an arm which is formed on the bed, a frame for holding a work, a movement device for moving the frame along the bed in the horizontal direction, an embroidering device set in the body for embroidering the work, a detecting device for detecting a pattern which is drawn on the work, and a controller for controlling the movement means based on an information which is detected by the detecting device.

4 Claims, 8 Drawing Sheets

EMBROIDERING MACHINE

BACKGROUND OF THE INVENTION

1. Field of the Invention

This invention relates to an embroidering machine.

2. Description of the Prior Art

Conventionally, it is well known that an embroidering machine does embroidery on a work based on embroidering data. The embroidering data which indicates embroidering designs to the embroidering machine is previously inputted in a floppy disk by an embroidering data generating device such as a digitizer. The resulting floppy disk is inserted into the embroidering machine and then various designs are embroidered on the work while the embroidering machine reads data from the floppy disk.

However, the embroidering data generating device per se is very expensive. In addition, the preparation of the foregoing embroidering data is cumbersome.

SUMMARY OF THE INVENTION

It is an object of the invention to provide an improved embroidering machine which obviates the above conventional drawbacks.

It is another object of the invention to provide an improved embroidering machine which is free from the preparation of an embroidering data.

In order to attain the foregoing objects, an embroidering machine comprises a body including a bed and an arm which is formed on the bed, a frame for holding a work, a movement device for moving the frame along the bed in the horizontal direction, an embroidering device set in the body for embroidering the work, a detecting device for detecting a pattern which is drawn on the work, and a controller for controlling the movement means based on information which is detected by the detecting device.

BRIEF DESCRIPTION OF THE DRAWINGS

The above and other objects, features and advantages of the present invention will be more apparent and more readily appreciated from the following detailed description of a preferred exemplary embodiment of the present invention, taken in connection with the accompanying drawings, in which.

DESCRIPTION OF THE PREFERRED EMBODIMENT

Figure 1:
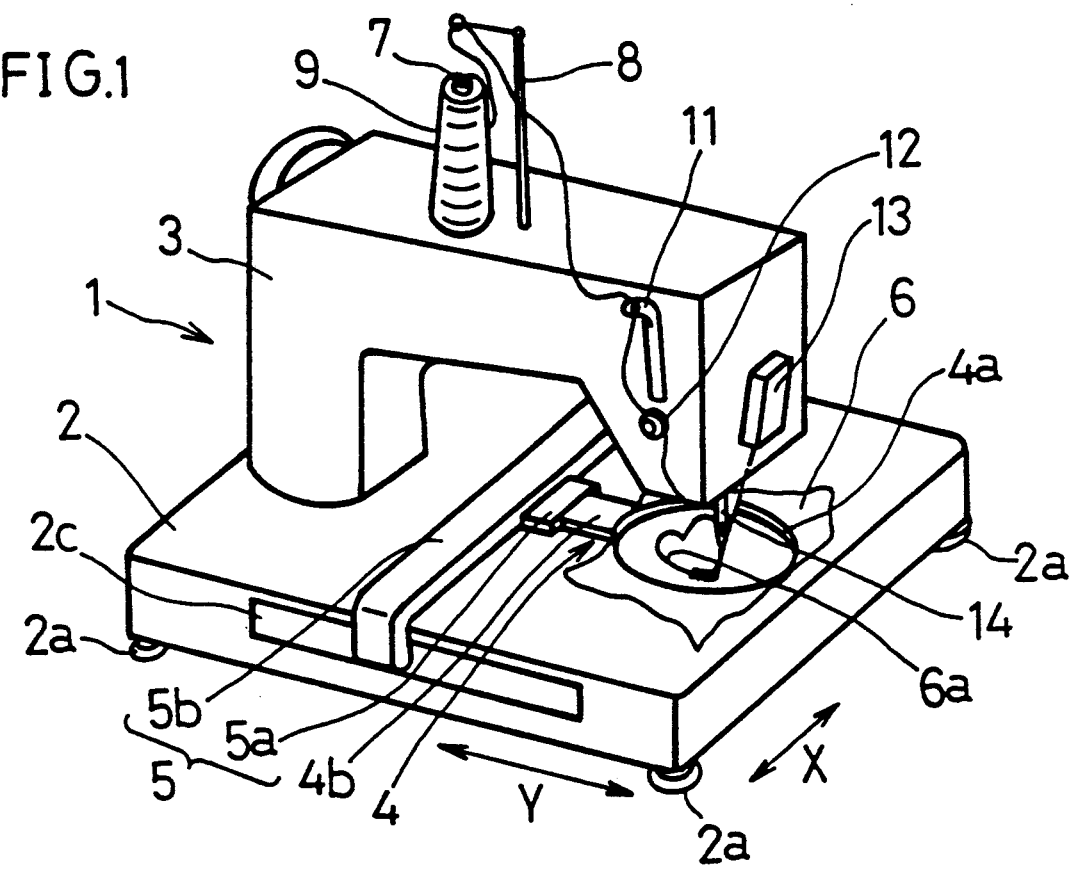
FIG. 1 is a schematic view of an embroidering machine according to the present invention.
Figure 2:
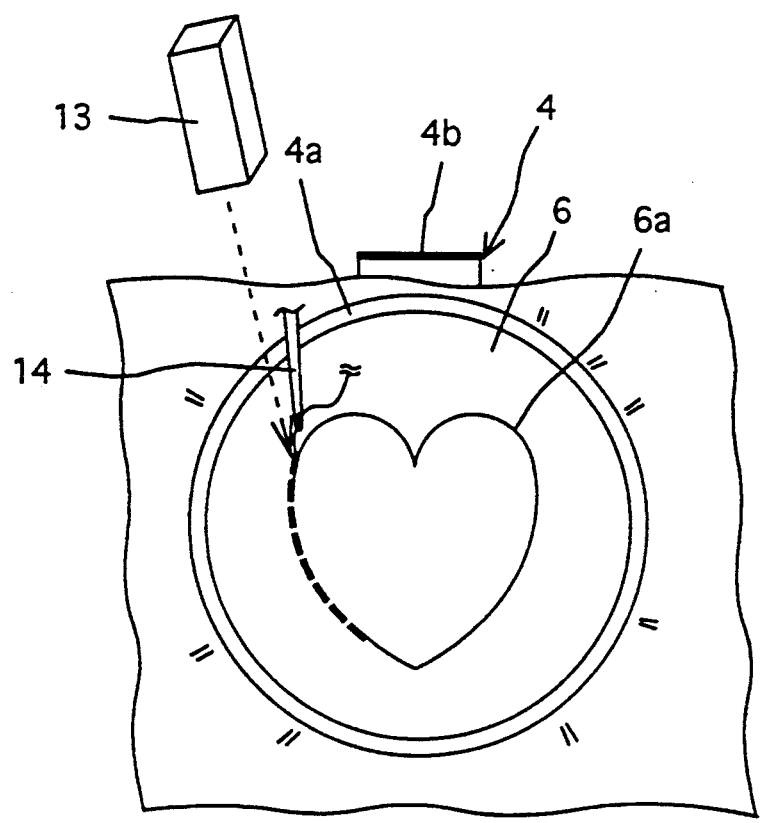
FIG. 2 is a front view of a work on which a line stitch is sewn by an embroidering machine according to the present invention.
Figure 3:
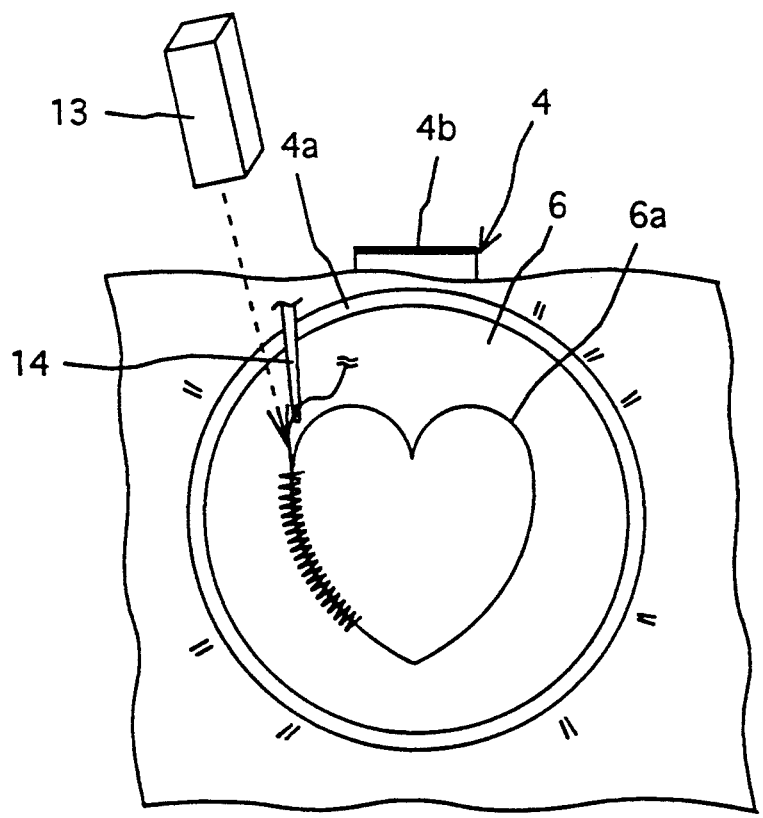
FIG. 3 is a front view of a work on which a zigzag stitch is sewn by an embroidering machine according to the present invention.

Referring to FIGS. 1 to 4 inclusive, there is illustrated an embroidering machine 1 which mainly includes a bed 2 having four legs 2a and an arm 3 standing on the bed 2. A frame 4 which can hold a work 6 to be sewn is located at a position near an upper surface of the bed 2. The frame 4 includes a frame body (not shown) having an installation part 4b and a frame ring 4a which is fitted in an inner surface of the frame body. At first, the work 6 is set on the frame body and the frame ring 4a is fitted, via the work 6, in the inner surface of the frame body. Thus the work 6 is held with tension between the frame body and the frame ring 4a and is in close relationship to the bed 2. The installation part 4b is connected to an operation device 5 and is operated along the bed 2 in the X-Y directions.

Figure 4:
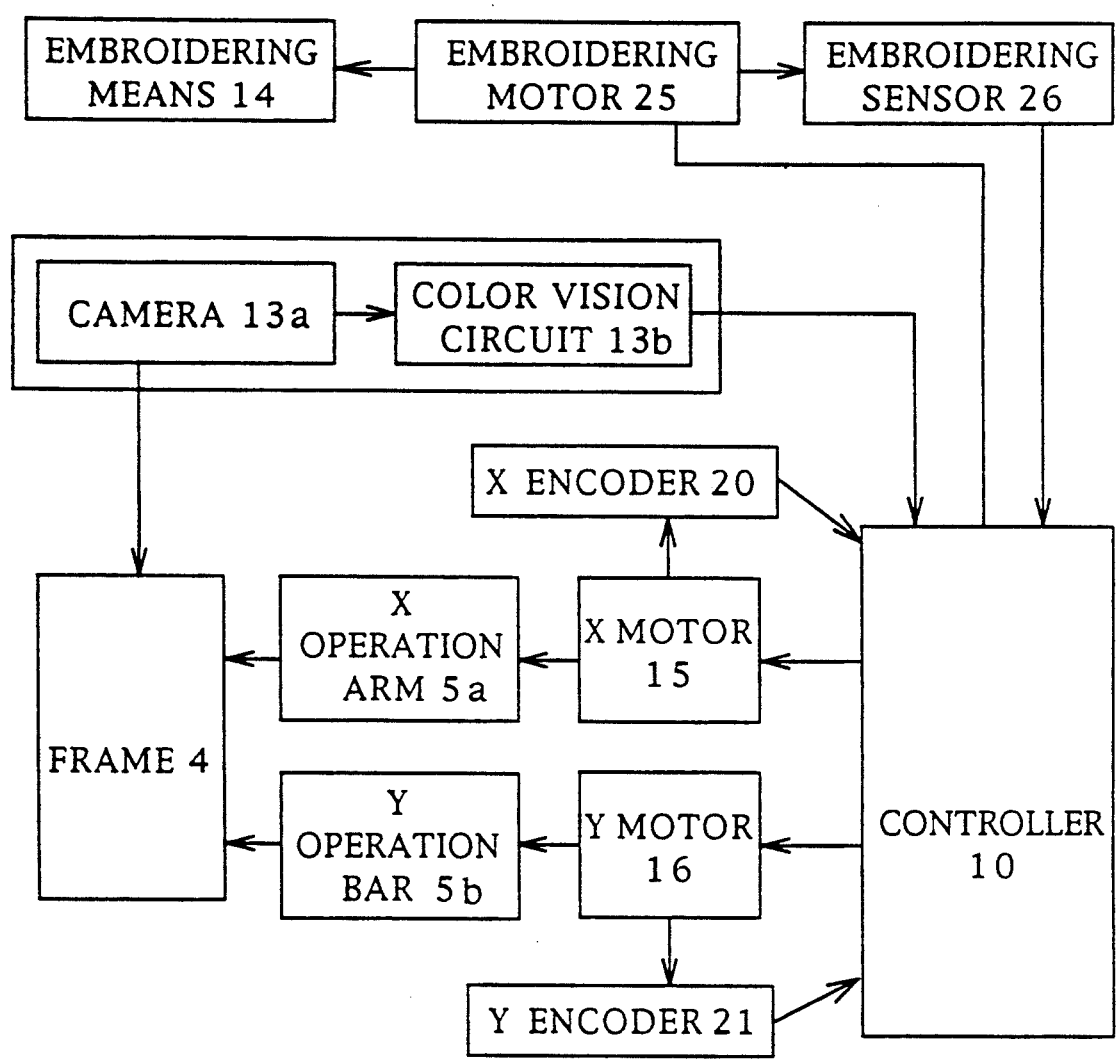
FIG. 4 is a block diagram of a controller according to the present invention.

The operation device 5 includes an operation arm 5a which moves the frame 4 in the X direction and an operation bar 5b which moves the frame 4 in the Y direction. One end of the operation arm 5a is connected to the installation part 4b and the other end thereof is connected slidably to a groove (not shown) which is formed on the side of the operation bar 5b. The operation arm 5a is moved along the groove of the operation bar 5b by an X motor 15 installed in the bed 2. A pair of longitudinal slots 2c are formed in both sides of the bed 2 and both ends of the operation bar 5b are in sliding engagement with the corresponding slots 2c. The operation bar 5b moves in the Y direction along the slots 2c when a Y motor 16 operates. The Y motor is also installed in the bed 2, and the X motor 15 and the Y motor 16 are controlled by a controller 10. Furthermore an X encoder 20 and a Y encoder 21, both of which are shown in FIG. 4, are connected to the X motor 15 and the Y motor 16, respectively. The X and Y encoders 20 and 21 each check the rotation number of each of the X motor 15 and the Y motor 16, and the resulting numbers are provided as signals to the controller 10. Thus the controller 10 recognizes the location of the frame 4.

On the upper surface of the arm 3, there are installed an upper thread standing bar 7 which holds an upper thread 9, and a guide 8. The upper thread 9 is guided to a needle 14 through the guide 8, a beam 11, and an upper thread adjustment device 12. The needle 14 is reciprocated between the arm 3 and the bed 2 vertically when an embroidering motor 25 is operated by the controller 10. The rotation number of the embroidering motor 25 is always detected by an embroidering sensor 26 which provides the signal to the controller 10. Moreover, a lower thread shuttle device which holds the lower thread is installed under the bed 2 and is operated in synchronization with the needle 14.

Figure 5:
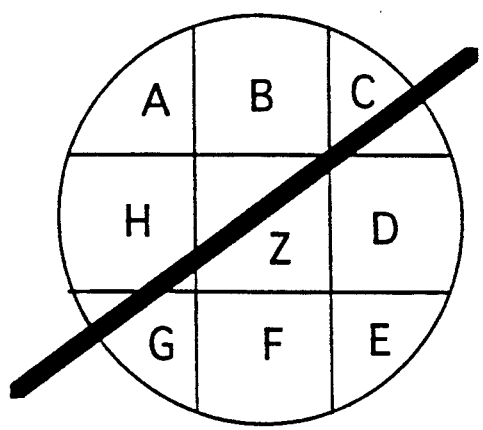
FIG. 5 is a picture caught by a camera of a sensor according to the present invention.

A sensor 13 for detecting the pattern 6a drawn on the work is installed on the wall of the arm 3. The sensor 13 includes a camera 13a which catches the pattern 6a and a color vision circuit 13b which provides a position of the pattern 6a to the controller 10 based on the image caught by the camera 13a. The picture caught by the camera 13a is provided to the color vision circuit 13b and is divided into 9 sections A to H and Z as shown in FIG. 5. The camera 13a can take or catch the pattern 6a near the portion where the needle 14 penetrates the work 6.

The embroidering means including the needle 14 and the operation device 5 is controlled by the controller 10. The controller 10 is provided with the signal which shows the position of the pattern 6a through the color vision circuit 13b of the sensor 13 and controls the operation of the operation device 5 based thereon.

Figure 6:
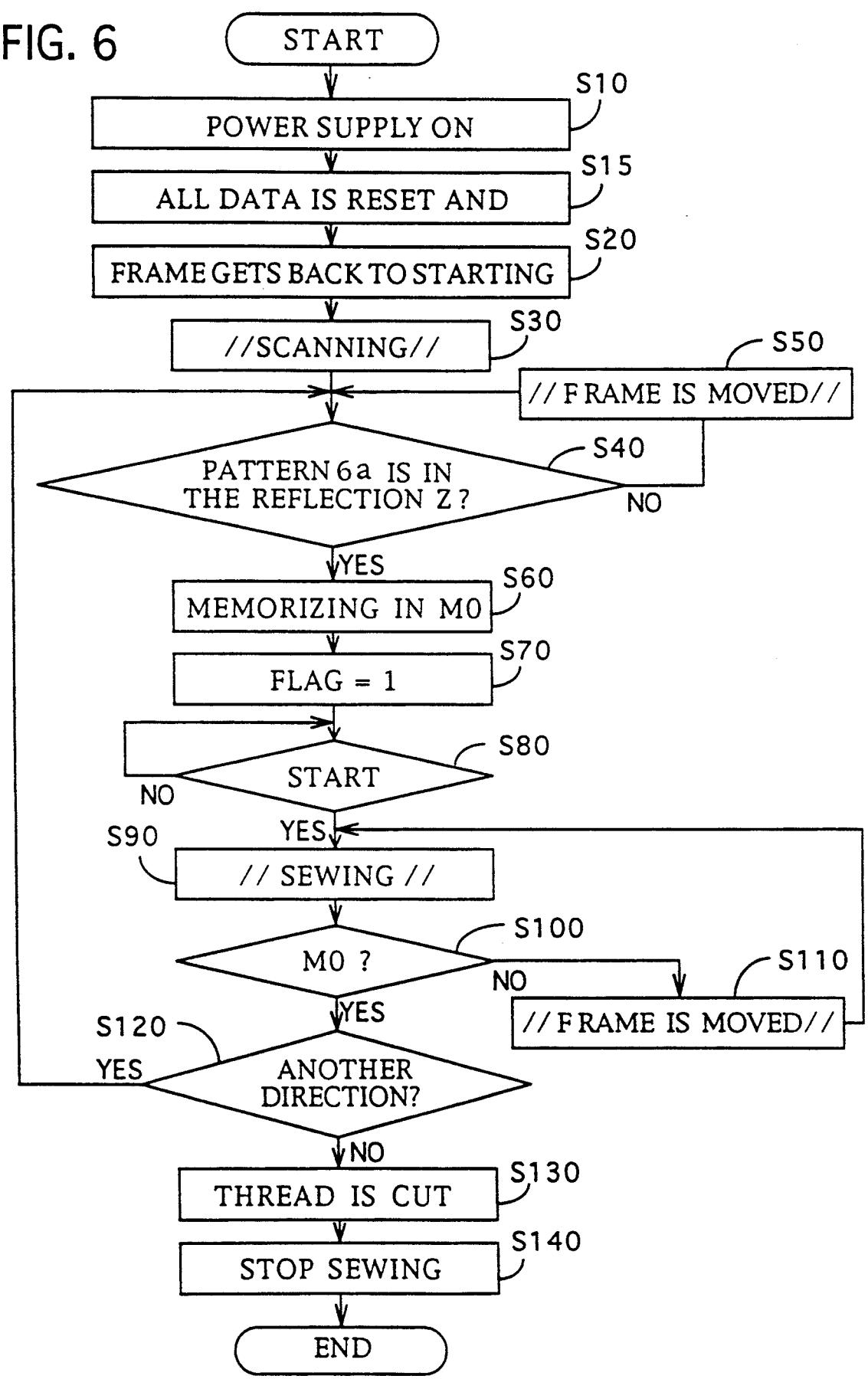
FIG. 6 is a flow chart of a main routine showing the operation according to the present invention.
Figure 7:
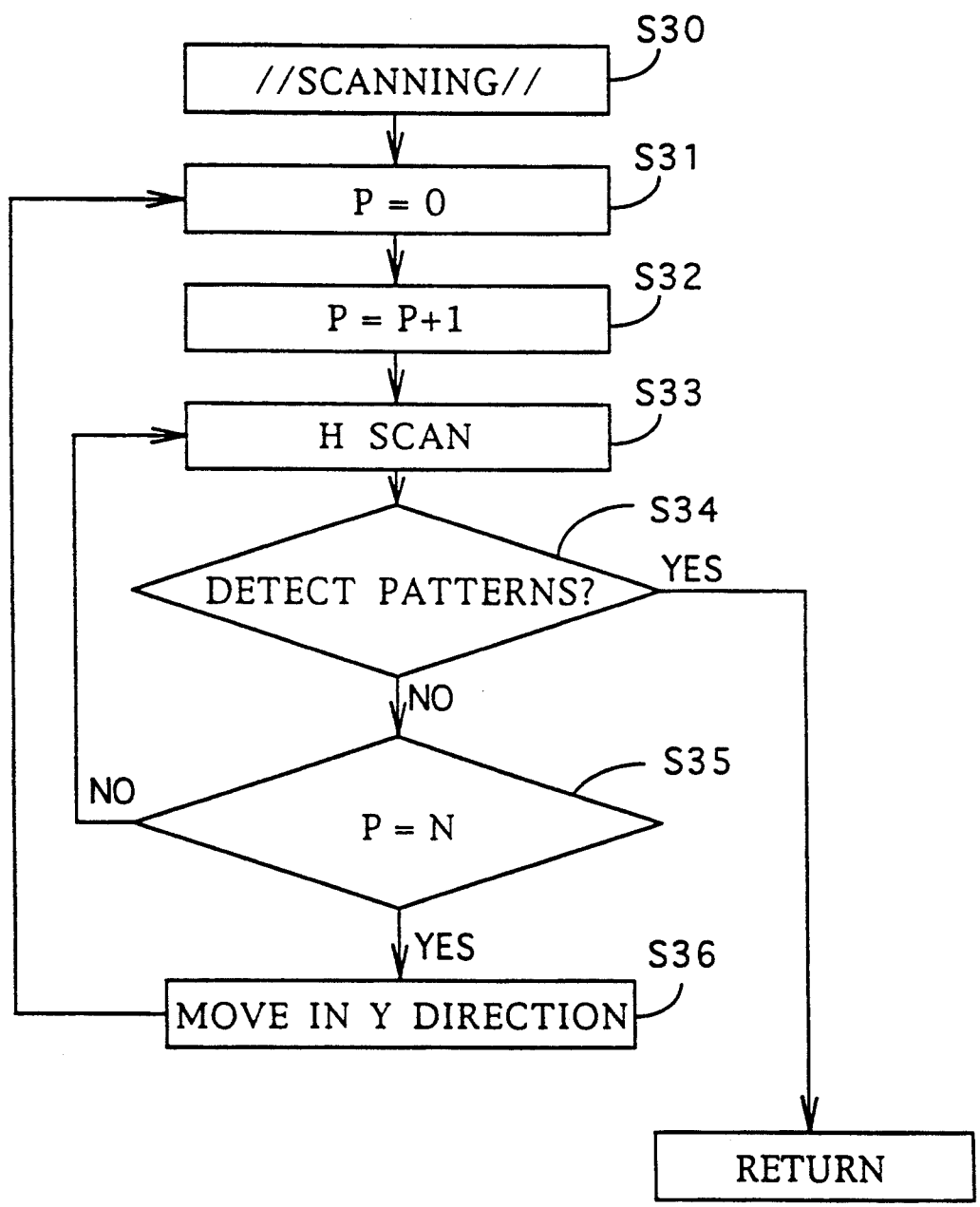
FIG. 7 is a flow chart of a sub routine showing the scanning routine according to the present invention.

The embroidering machine 1 in this embodiment is operated as follows. At first, the operator draws the pattern 6a, which he/she will embroider on the work with different color from that of the work 6 and the resultant work 6 is fixed to the frame 4. Referring to FIG. 6, the embroidering machine is turned on or connected to the power supply in Step 10. Next, Step 15 is performed for initializations wherein all data in register and flag are reset and cleared. In Step 20, the X motor 15 and the Y motor 16 are operated and the frame 4 gets back to its starting point. When the frame 4 is on the starting point in this embodiment, the camera 13a reflects the periphery of the frame 4. In Step 30, a scanning routine is performed. Referring to FIG. 7, the register P which is set in the controller 10 is reset to "0" in Step 31. In Step 32 an increment of 1 is added to the register P. In Step 33, the frame 4 is moved for a set distance in the X direction by the X motor 15 and the work 6 is scanned in the X direction for same distance with the frame 4. If the sensor 13 detects no pattern 6a in Step 34, the Step 35 is performed and it is judged whether or not the count of the register P has attained a set point N. If the count of the register P has attained the set point N, Step 36 is performed and the frame 4 is moved in the Y direction by the Y motor 16 and the control is returned to Step 31. If the count in the register P hasn't attained the set point N, the control is returned to Step 33 without motion in the Y direction. The count N means the full movement of the work 6 from one end to the other end in the X direction.

Figure 8:
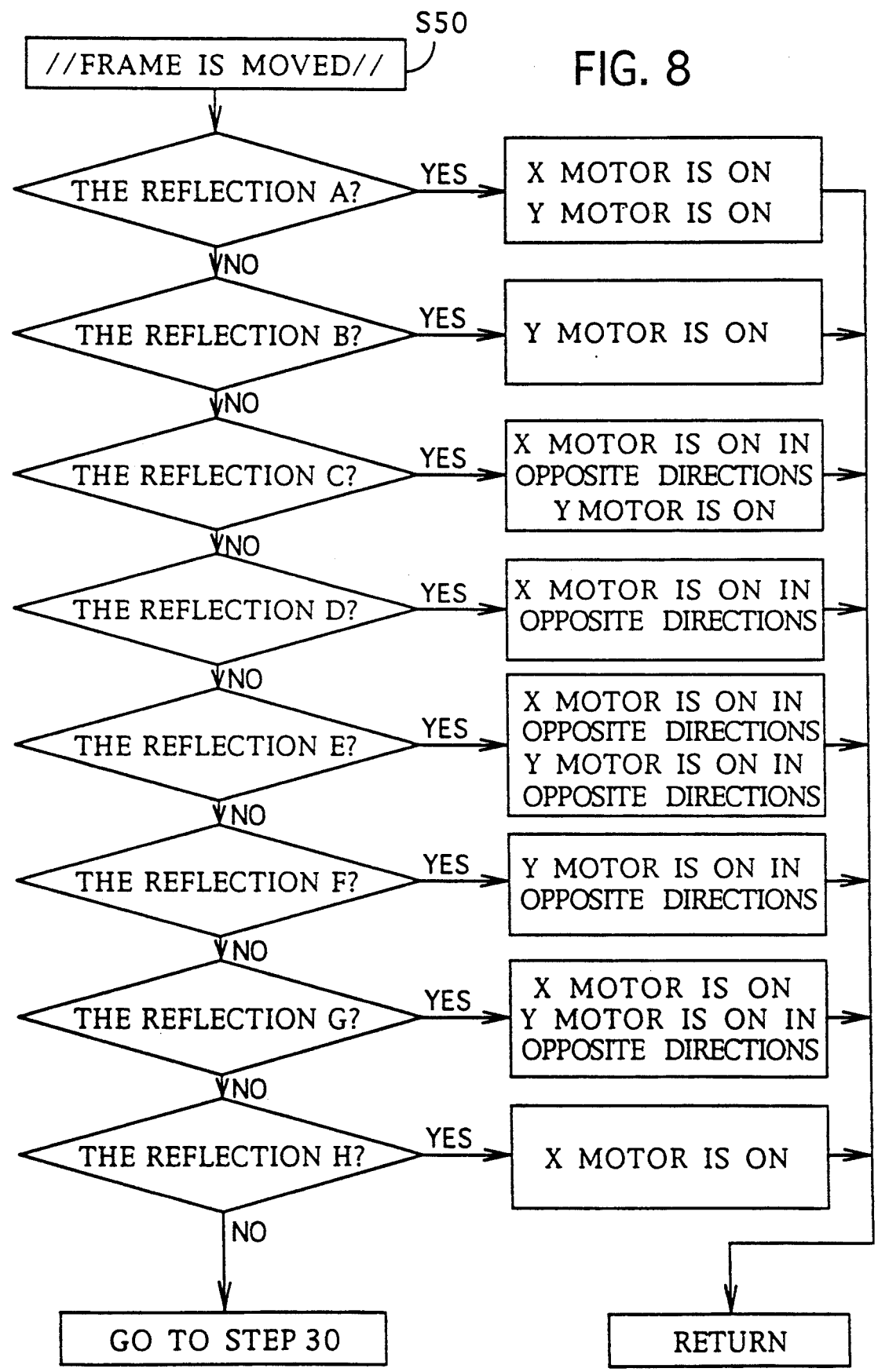
FIG. 8 is a flow chart of a sub routine showing the frame moving routine in Step 50 in FIG. 6 according to the present invention.

If the sensor 13 detects a pattern 6a in Step 34, Step 40 is performed and it is checked whether or not a pattern 6a is detected in the section Z (FIG. 5). In the case of "Yes", the control goes to Step 40. If Step 60 shows a negative conclusion, the control goes to Step 50 which is shown in FIG. 8 in detail. In Step 50, the portion where the pattern 6a exists is searched from the section A to the section H in turn and the X motor 15 and/or the Y motor 16 are operated. Thus the pattern 6a is moved and an initial portion where embroidered at first is set into the section Z.

Figure 9:
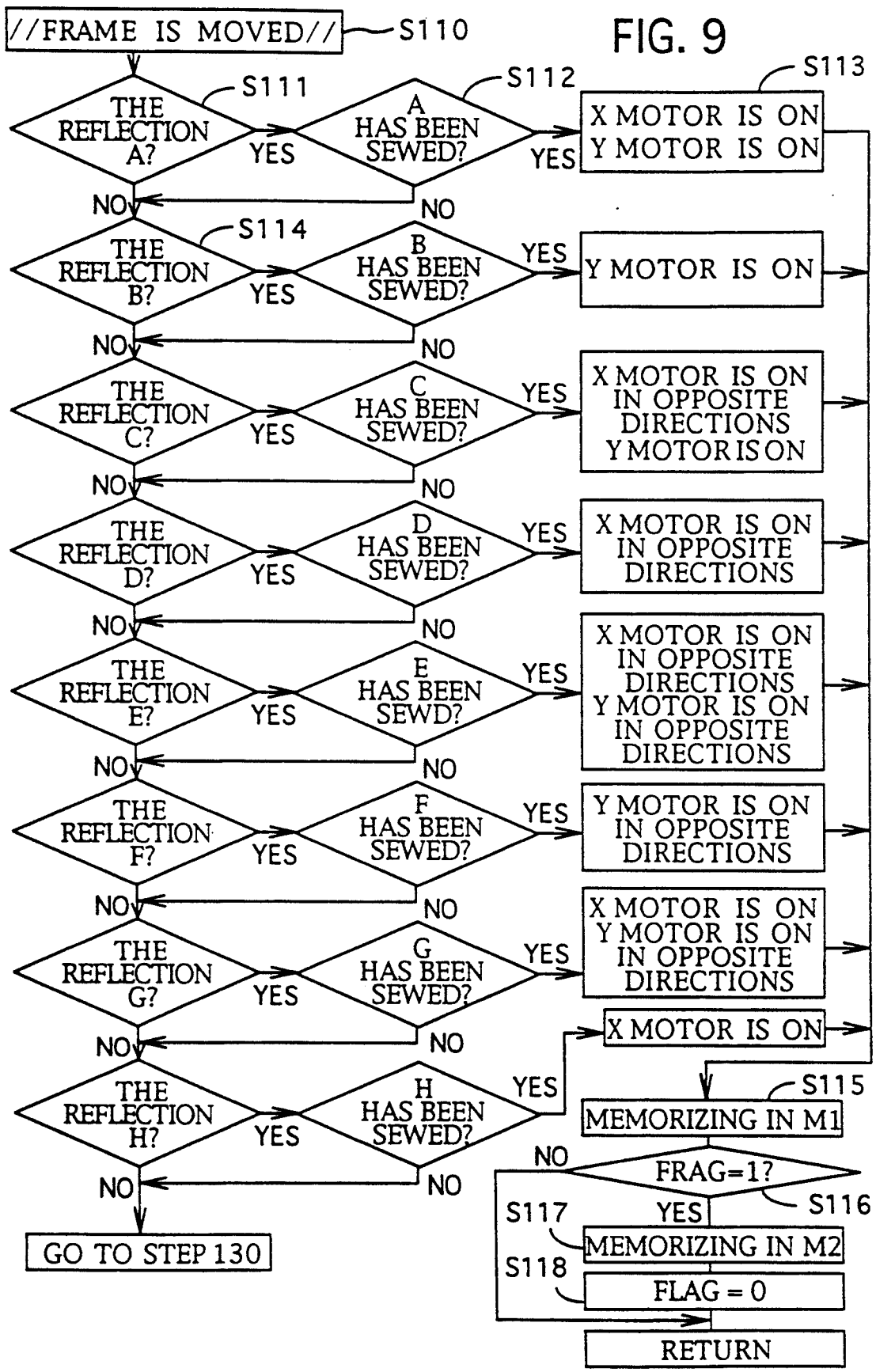
FIG. 9 is a flow chart of a sub routine showing the frame moving routine in Step 110 in FIG. 6 according to the present invention.
Figure 10:
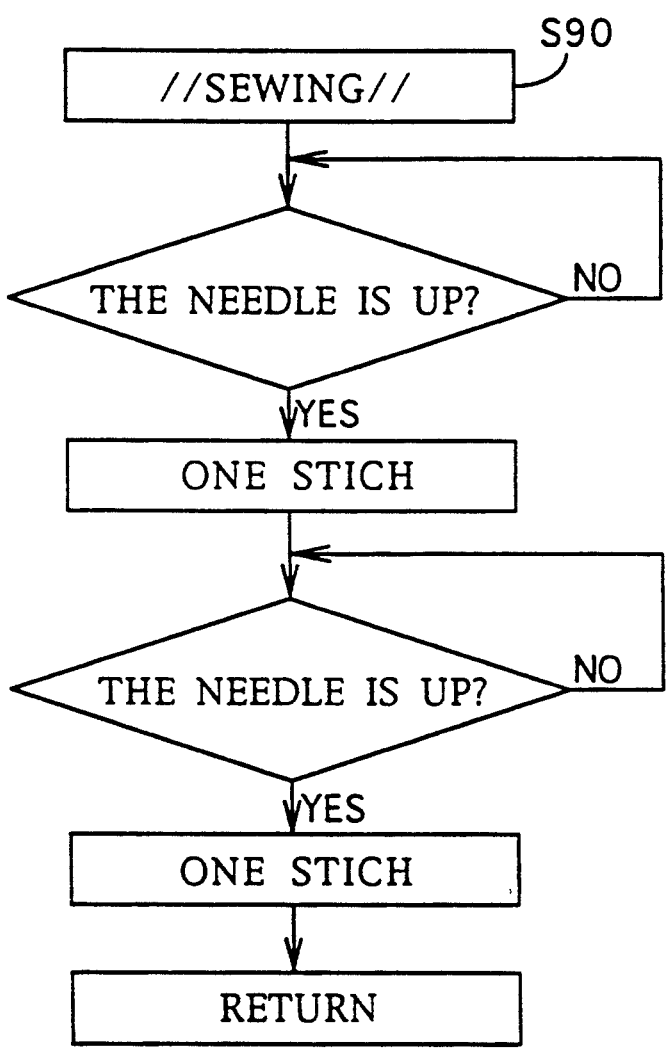
FIG. 10 is a flow chart of a sub routine showing the sewing routine according to the present invention.

In Step 60, the initial portion of the pattern 6a is memorized in a memory M0 and Step 70 is performed so that a flag is set to "1". The flag condition means the initial sewing and the flag will be reset to "0" in Step 118 which will be described later. In Step 80, if the operator gives instructions to start the sewing operation, Step 90 is performed for starting a sewing of settled stitches shown in FIG. 10. In step 100, it is judged whether a portion sewn in Step 90 is the initial portion or not, namely, whether the needle 14 is back at the initial portion or not. In the case of "No", Step 110 is performed and the frame 4 is moved so as to sew the next portion of the pattern 6a. Step 110 is described in FIG. 9 in detail. In Step 110, the next sewn portion is searched, namely, the portion where the pattern 6a exists is searched from the section A to the section H in turn. For example, in Step 111, it is judged whether the pattern 6a is in the section A or not. If it is not therein, the control goes to Step 114. If it is therein, Step 112 is performed and it is judged whether the section A is the same portion memorized in a memory M1 or not. Namely, it is judged whether the section A has been sewn yet or not. The memory M1 is inputted in Step 115 and it is cleared at first sewing. If the section A has not been sewn, the X motor 15 and the Y motor 16 are operated. Thus the portion of the work 6 which is caught in the section A is moved or transfered into the section z. In step 115, the memory M1 is reset and the distance and direction that the work 6 has been moved are memorized in the memory M1. In Step 116, it is judged whether the flag is set to "1" or not. In the case of "Yes", which means the first sewing, the distance and direction that the work 6 has been moved are memorized in a memory M2 as the data which shows the first sewn portion. Next, Step 117 is performed and the flag is reset to "0" and the control returns to the main routine.

Thus, the sewing operation is performed from Step 90 to Step 110. In step 100, if it is judged that a portion sewn in Step 90 is the initial portion, namely, the needle 14 gets back to the initial portion memorized in memory M0, Step 120 is performed and the pattern 6a is searched without the portion which is memorized in the memories M1 and M2. In this step, it is judged whether there are any branches at the pattern in the initial portion or not. In the case of "Yes", the control returns to Step 90. In the case of "No", Step 130 is performed and the upper thread 9 and the lower thread are cut. Next, the last step, that is, Step 140 is performed and sewing is stopped.

As regards the above embodiment, the sewing pattern can be selected. For example, the work 6 can be sewn with a line stitch referring to FIG. 2 or a zigzag stitch referring to FIG. 3. In the latter case, the operator can give instructions about the distance and the width which the work is sent and the work can be embroidered by more variety patterns.

As mentioned above, according to the present invention, the embroidering machine embroiders on the work 6 along the pattern 6a which is drawn thereon, which means that no preparation of embroidering data in advance is required. Thus, much time can be saved and the embroidering is made easy.

Obviously numerous modifications and variations of the present invention are possible in light of the above teachings. It is therefore to be understood that within the scope of the appended claims, the invention may be practiced otherwise than as specifically described herein.

What is claimed is:

1. An embroidering machine comprising;
   a body including a bed and an arm positioned on the bed;
   a frame for holding a work;
   movement means for moving the frame along the bed in a horizontal direction;
   embroidering means provided on the body for embroidering the work;
   detecting means for detecting a pattern which is drawn on the work; and
   a controller for controlling the embroidering means to cause operation of the embroidering means every time a portion of the pattern on the work is detected by the detecting means, said detecting means comprising a camera which catches the pattern drawn on the work, and a color vision circuit which provides a position of the pattern to the controller based on the image caught by the camera.

2. An embroidering machine according to claim 1, wherein the movement means comprises first driving means having an operation arm which is movably mounted on the bed for moving the frame in a first direction, and second driving means having an operation bar whose one end is slidably mounted on the operation arm and whose other end is fixed to the frame and set to operate the frame in a second direction perpendicular to the first direction.

3. An embroidering machine according to claim 1, in which the color vision circuit divides the image which is caught by the camera into plural sections and provides each of the sections as a signal which shows the position of the pattern to the controller.

4. An embroidering machine according to claim 1, in which the controller comprises a memory which memorizes a position where embroidering has been completed.

* * * * *